(12) United States Patent
Paz et al.

(10) Patent No.: US 12,510,203 B2
(45) Date of Patent: Dec. 30, 2025

(54) METHODS AND SYSTEMS FOR SEALING A SERVICE PIPE

(71) Applicant: CURAPIPE SYSTEM LTD., Kiryat Malachi (IL)

(72) Inventors: Peter Paz, Har Adar (IL); David Hercky, Raanana (IL)

(*) Notice: Subject to any disclaimer, the term of this patent is extended or adjusted under 35 U.S.C. 154(b) by 393 days.

(21) Appl. No.: 17/599,557

(22) PCT Filed: Mar. 19, 2020

(86) PCT No.: PCT/IL2020/050323
§ 371 (c)(1),
(2) Date: Sep. 29, 2021

(87) PCT Pub. No.: WO2020/202134
PCT Pub. Date: Oct. 8, 2020

(65) Prior Publication Data
US 2022/0178489 A1    Jun. 9, 2022

Related U.S. Application Data

(60) Provisional application No. 62/827,871, filed on Apr. 2, 2019.

(51) Int. Cl.
*F16L 55/164*    (2006.01)
*F16J 15/14*    (2006.01)
*F16L 55/179*    (2006.01)
*F16L 55/42*    (2006.01)
*F16L 101/60*    (2006.01)

(52) U.S. Cl.
CPC .............. *F16L 55/164* (2013.01); *F16J 15/14* (2013.01); *F16L 55/179* (2013.01); *F16L 55/42* (2013.01); *F16L 2101/60* (2013.01)

(58) Field of Classification Search
CPC ....... F16L 55/164; F16L 55/179; F16L 55/42; F16L 15/14; F16L 2101/60
See application file for complete search history.

(56) References Cited

U.S. PATENT DOCUMENTS

| | | | |
|---|---|---|---|
| 5,230,842 A * | 7/1993 | Munde | F16L 55/26 |
| | | | 264/269 |
| 11,009,175 B2 * | 5/2021 | Perstnev | F16L 55/42 |
| 2017/0363245 A1 * | 12/2017 | Perstnev | F16L 55/42 |
| 2020/0124223 A1 * | 4/2020 | Phillis | F16L 55/162 |

* cited by examiner

*Primary Examiner* — David R Deal
(74) *Attorney, Agent, or Firm* — Daniel J. Swirsky; AlphaPatent Associates Ltd.

(57) ABSTRACT

The present invention provides methods and systems for sealing at least one leak in at least one of at least one lateral pipe and a mains pipe, the method including passing a at least one of a pig train and said sealant composition under pressure along at least one of said main pipeline and said at least one lateral pipe such that a portion of the sealant composition enters at least one leakage site to seal and cure the at least one leak.

22 Claims, 7 Drawing Sheets

METHODS AND SYSTEMS FOR SEALING A SERVICE PIPE

FIELD OF THE INVENTION

The present invention relates generally to methods for sealing pipelines, and more specifically to methods for sealing lateral, service and minor pipelines of a main pipeline.

BACKGROUND OF THE INVENTION

Many liquids and gases are transported overland via pipelines, which extend for hundreds of kilometers. These pipelines are subject to ageing, corrosion, cracks, earthquakes and other impacts, which can cause minor or major leakage. The leakage may be difficult to detect and yet more difficult to stop.

A leakage may be discovered by a sharp pressure-drop over the length of the pipeline, or by emission of the gas/liquid from the pipeline. This may lead to significant environmental pollutions and to massive financial loss. The repair of underground pipelines poses a series of complicated technological problems considering the relevant factors, including, difficult accessibility, partial or complete replacement of part of the pipeline, or in situ pipeline repair.

Russian Patent No. 2063273 describes a method of in-situ repair by injecting specific chemical substances from both sides of a damaged leakage location.

WO2008/081441, to Perstnev et al., describes a method of repairing leakage in pipelines. The method includes the steps of forming a first and second openings (14a, 14b) in the pipeline (10) upstream and downstream, respectively, of the leakage location, inserting through the first opening (14a) a first body (C1), filling the space arrear of the first body (C1) with a first viscous sealing material (M1), inserting through the first opening (14a) a second body (C2) arrear of the first viscous sealing material (M1) compressing the first sealing material by applying a pressure against the first and the second bodies (C1, C2) in opposite directions, causing the first and second bodies (C1, C2) and the compressed first sealing material (M1) to move in unison in the direction of the second opening (14b), and retrieving the first and second bodies (C1, C2). Preferably, the method is performed using three bodies (C1, C2, C3) and two sealing materials (M1, M2).

WO2016042541A1 provides pipeline pigs for maintenance of a pipeline, the pig including two adjacent ovular sections generally symmetrically disposed about a vertical axis, a polymeric band disposed along the vertical axis, the band being adapted to reduce a cross section of the pig along the axis and a longitudinal inner support member disposed centrally along the ovular sections and perpendicularly to the vertical axis.

WO2016098093A1 to Perstnev et al., describes systems for curing a leakage in a pipeline, the system including at least one gel pig and at least one sealant composition; wherein the at least one gel pig and the at least one sealant composition form a pig train, adapted to move along the pipeline to a region of the leakage and to seal the leakage.

WO2016098094A1 to Perstnev et al., describes methods for curing a leakage in a pipeline, the system including at least one gel pig and at least one sealant composition; wherein the at least one gel pig and the at least one sealant composition form a pig train, adapted to move along the pipeline to a region of the leakage and to seal the leakage.

WO2016098095A1 to Perstnev et al., provides leakage plugging devices and methods for sealing a leakage at a remote site in a pipe, the device including a porous carrier plug of a deformable material including pores and at least one sealant composition disposed in the pores, wherein the porous carrier plug is adapted to transport the at least one sealant composition from a first site to a remote site and to plug the leakage at the remote site.

Many industrial applications use fibers. Typically, fibers are used in compositions for building purposes. Some fibers are in the form of a yarn, that is, a continuous often-plied strand composed of either natural or man-made fibers or filaments.

In one non-limiting example, hemp yarn has a size of Nm 10 (Nm 10 yarn=10,000 meters per kilogram, or about 4,960 yards per pound) from single to multiple plies of 1, 2, 3, 6 and 12 in either natural or bleached (using peroxide) Made from earth-friendly wet spun hemp, these yarns are smooth and durable The yarns may be provided on spools or in packages and may be single-ply, 2-ply, 3-ply, 5-ply, 6-ply and 12-ply or combinations thereof.

Several technologies have been developed to seal mains pipelines, but there remains a need to seal lateral pipelines. In many urban communities, up to 50% of the total water is lost due from a large number of service and lateral pipes.

Thus, there still remains a need for improved methods for sealing leaks in lateral pipelines.

SUMMARY OF THE INVENTION

The present invention provides methods and systems for sealing at least one leak in at least one of at least one lateral pipe and a mains pipe, the method including passing a at least one of a pig train and said sealant composition under pressure along at least one of said main pipeline and said at least one lateral pipe such that a portion of the sealant composition enters at least one leakage site to seal and cure the at least one leak.

It is an object of some aspects of the present invention to provide methods for sealing leaks in lateral pipelines.

In some embodiments of the present invention, improved methods are provided for sealing leaks in lateral pipelines.

In other embodiments of the present invention, pipeline sealant compositions are provided for sealing lateral pipeline leaks. The mains pipelines may be of any length. The lateral pipes are typically, but not necessarily less than 1000 m, 100 or 50 m. Typically, lateral pipes have internal diameters of ⅜, ½, ¾, 1, 1.5 and 2 inches. The pipes or pipelines may be made of any suitable material or material combination, selected from, but not limited to, cast iron, ductile iron, steel, HDPE/MDPE, PVC and the like.

In additional embodiments for the present invention, quick-curing pipeline sealant compositions are provided which are introduced into a mains line in order to seal a leak in a lateral pipeline.

The present invention provides a method of sealing a leak in a lateral pipe, the method including passing a repair composition under pressure along a main pipeline such that a portion of the repair composition enters the lateral pipe from the main pipeline and allowing the portion to reach the leak and to seal the leak.

According to several embodiments, in some case, the terminus of the lateral is isolated (i.e. terminated or valved off) and the sealant composition or pig train is drawn into the lateral by virtue of the leakage flow alone. According to other embodiments, a tap is disposed at the terminus of the lateral pipe to discharge liquid thus compensating for cases where the leakage flow alone is small.

There is thus provided according to an embodiment of the present invention, a method for sealing a leak in a lateral pipe, the method including;
 a. passing a repair composition under pressure along a main pipeline such that a portion of the repair composition enters the lateral pipe from the main pipeline; and
 b. allowing the portion to reach the leak and to seal the leak.

There is thus provided according to another embodiment of the present invention, a method for sealing a leak in a second lateral pipe, the method comprising:
 a. passing a repair composition under pressure along a first lateral pipeline and main pipeline such that a portion of the repair composition enters the second lateral pipe from the main pipeline; and
 b. allowing the portion to reach the leak and to seal the leak.

There is thus provided according to another embodiment of the present invention, a method for sealing a leak in a first lateral pipeline, the method comprising:
 a. passing a repair composition under pressure along the first lateral pipeline to a main pipeline such that a portion of the repair composition enters a location of said leak to seal the leak.

The present invention provides systems and methods for curing a leakage in a pipeline, the system including at least one fiber-in-liquid sealant composition and at least one gel pig; wherein the at least one gel pig and the at least one fiber-in-liquid sealant and form a pig train, adapted to move along the pipeline to a region of the leakage and to seal the leakage.

There is thus provided according to an embodiment of the present invention, a system for curing at one leakage site in a pipeline, the system including;
 a) at least one gel pig; and
 b) at least one fiber-in-sealant composition; wherein the at least one gel pig and the fiber-in-liquid carrier or sealant composition form a pig train, adapted to move along the pipeline to a region of the at least one leakage and to seal the at least one leakage.

A non-limiting example of a sealant composition is:
 a) fibers of different sizes;
 b) Silica;
 c) at least one sealant; and
 d) water.

Additionally, according to an embodiment of the present invention, the main pipeline and lateral pipe are adapted to convey a fluid selected from the group consisting of water, oil, gas, petrol, a heating fluid and a cooling fluid.

Moreover, according to an embodiment of the present invention, the repair composition is disposed in a repair composition train.

Further, according to an embodiment of the present invention, the repair composition train includes two pigs with the repair composition disposed therebetween.

Furthermore, according to an embodiment of the present invention, the repair composition train includes a rear pig and the repair composition.

Yet further, according to an embodiment of the present invention, the repair composition train includes three pigs with the repair composition disposed between a first and a second the pigs and a second repair composition disposed the second and a third pig.

Additionally, according to an embodiment of the present invention, the pigs are liquid phase pigs.

Additionally or alternatively, according to an embodiment of the present invention, the pigs are solid phase pigs.

Importantly, according to an embodiment of the present invention, the repair composition is at a temperature of 4-120° C.

Additionally, according to an embodiment of the present invention, the repair composition includes;
 a hardener;
 a resin;
 an elastic material; and
 a polycondensate material.

Moreover, according to an embodiment of the present invention, the liquid phase pigs include;
 a cellulosic polysaccharide;
 a surfactant; and
 water.

Further, according to an embodiment of the present invention, the liquid phase pigs further include;
 a filler; and
 a metallic hydroxide.

Additionally, according to an embodiment of the present invention, the liquid phase pigs further include an oil.

Yet further, according to an embodiment of the present invention, the leak is selected from the group consisting of a hole, a crack, a corroded section and combinations thereof.

It should be noted that according to an embodiment of the present invention, the leak loses 1-15,000 l/hr of the fluid.

Additionally, according to an embodiment of the present invention, the method further includes sealing at least one leak in the main pipeline.

Additionally or alternatively, according to an embodiment of the present invention, the method further includes sealing a plurality of leaks in a plurality of lateral pipes.

Furthermore, according to an embodiment of the present invention, the pressure is in a range of 0.1-20 bar.

Moreover, according to an embodiment of the present invention, at least part of the rear pig and at least a portion of the repair composition enter the lateral pipe.

Additionally, according to an embodiment of the present invention, the seal is formed in less than twenty minutes after reaching the leak.

Further, according to an embodiment of the present invention, the seal is formed in less than five minutes after reaching the leak.

Additionally, according to an embodiment of the present invention, the seal is cured in less than three hours after sealing the leak.

There is thus provided according to an embodiment of the present invention, a system for sealing a leak in a lateral pipe from a main pipeline, the system including;
 at least one repair composition;
 at least one pig; and
 a pressure control system for controlling at least one of a pressure in the main pipeline and a pressure in the lateral pipe.

Additionally, according to an embodiment of the present invention, the at least one repair composition includes two repair compositions.

Further, according to an embodiment of the present invention, the at least one pig includes one pig.

Additionally, according to an embodiment of the present invention, the at least one pig includes two pigs.

Furthermore, according to an embodiment of the present invention, the at least one pig includes three pigs.

Additionally, according to an embodiment of the present invention, the at least one pig includes a gel pig.

Moreover, according to an embodiment of the present invention, the at least one pig includes a plurality of gel pigs.

Further, according to an embodiment of the present invention, the method further includes enabling remains of the repair composition to return to the main pipeline after sealing the leak.

Additionally, according to an embodiment of the present invention inlet and outlet valves of the main pipeline section are closed.

EMBODIMENTS

1. A method for sealing at least one leak in at least one of a mains pipe and at least one lateral pipe, the method comprising:
   passing at least one of a pig train and a sealant composition under pressure along the mains pipe and said at least one lateral pipe such that a portion of said at least one of a pig train and said sealant composition enters said at least one leakage site to seal said at least one leak.
2. A method according to embodiment 1, wherein said leak is in a first lateral pipe.
3. A method according to embodiment 1, further comprising passing said at least one of a pig train and said sealant composition from a second lateral pipe into said mains pipe.
4. A method for sealing a leak in a second lateral pipeline, the method comprising:
   passing at least one of a pig train and a sealant composition under pressure along a first lateral pipeline to a main pipeline such that a portion of said at least one of a pig train and a sealant composition enters said second lateral pipe line to a location of said leak to seal said leak.
5. A method for sealing a leak at a leakage site in a mains pipe, the method comprising:
   passing at least one of a pig train and a sealant composition under pressure along a lateral pipeline such that a portion of said at least one of a pig train and said sealant composition enters said mains pipe from said lateral pipeline; and
   allowing said portion to reach said leak site and to seal said leak.
6. A method according to any of embodiments 1-5, wherein the main pipeline and lateral pipe are adapted to convey a fluid selected from the group consisting of water, oil, gas, petrol, a heating fluid and a cooling fluid.
7. A method according to embodiment any of embodiments 1-5, wherein said pig train and said sealant composition comprise at least one gel pig.
8. A method according to embodiment 7, wherein said at least one gel pig comprises at least two gel pigs.
9. A method according to embodiment 8, wherein said pig train further comprises a sealant composition.
10. A method according to embodiment 9, wherein said sealant composition comprises at least one of fibers and chips.
11. A method according to embodiment 1, wherein said at least one of a pig train and said sealant composition is at a temperature of 3-50° C.
12. A method according to embodiment 9, wherein said sealant composition comprises:
    a. a hardener;
    b. a resin;
    c. an elastic material; and
    d. a polycondensate material.
13. A method according to embodiment 12, wherein said at least one gel pig comprises:
    a. a cellulosic polysaccharide; and
    b. water.
14. A method according to embodiment 13, wherein said at least one gel pig further comprises boric acid.
15. A method according to embodiment 1, wherein said leak is selected from the group consisting of a hole, a crack, a corroded section and combinations thereof.
16. A method according to embodiment 15, wherein said leak loses 1-3000 l/hr of said fluid.
17. A method according to embodiment 1, further comprising sealing at least one leak in said main pipeline.
18. A method according to any of embodiments 1-5, further comprising sealing a plurality of leaks in a plurality of lateral pipes.
19. A method according to any of embodiments 1-5, wherein said pressure is in a range of 0.4-10 bar.
20. A method according to any of embodiments 1-5, wherein said seal is formed in less than twenty minutes after reaching said leak.
21. A method according to any of embodiments 1-5, wherein said seal is formed in less than five minutes after reaching said leak.
22. A method according to embodiment 21, wherein said seal is cured in less than three hours after sealing said leak.
23. A system for sealing a leak in a lateral pipe from a main pipeline, the system comprising:
    a. at least one sealant composition;
    b. at least one gel pig; and
    c. a pressure control system for controlling at least one of a pressure in said main pipeline and a pressure in said lateral pipe.
24. A system according to embodiment 23, wherein said sealant composition further comprises
    a. fibers;
    b. Silica;
    c. at least one sealant; and
    d. water;
25. A system according to embodiment 24, where said fibers are in at least one form selected from the group consisting of: single fibers, wound fibers, yarns and combinations thereof.
26. A system according to embodiment 25, wherein said yarn is single-ply, 2-ply, 3-ply, 6-ply and 12-ply and combinations thereof.
27. The lateral pipes may be of a diameter in the range of 0.5-4 inches, 1-3 inches, or 2-2.5 inches.
28. The mains pipe may be of a diameter of 4-50 inches, 6-40 inches, 8-30 inches, 10-20 inches.
29. The lateral pipes may be of a length in a range of 1-1000 m, 10-500 m, 20-200m or 30-100 m.
30. The mains pipe may be of a length of 10-20000m, 100-10000m, 200-5000m, or 300-2000m.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more and fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The pigs, sealant compositions, carrier fluid compositions and chips used in the present invention may be any described in the following patents/patent applications, incorporated herein by reference:—WO2008/081441, to Perstnev et al., WO2016042541A1, WO2016098093A1, WO2016098094A1, WO2016098095A1, U.S. Pat. Nos. 9,045,648, 9,738,798B2, US20170299108A1, US20170363245A1 and US20180003330A1.

Figure 1A:
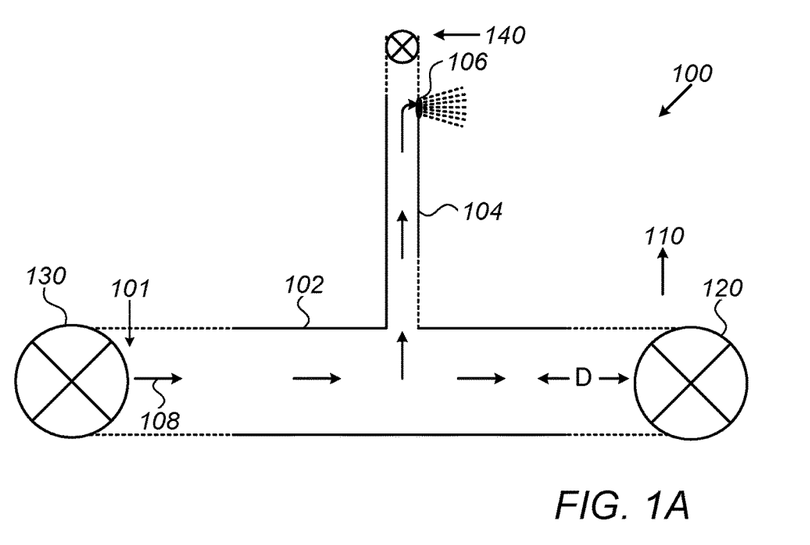
FIG. 1A is a simplified schematic diagram of a system for curing a leak in a lateral (service) pipe connected to a mains pipe, in accordance with an embodiment of the present invention.

Reference is now made to FIG. 1A, which is a simplified schematic diagram of a system 100 for curing a leak 106 in a lateral (service) pipe 104, connected to a mains pipe 102, in accordance with an embodiment of the present invention.

A sealant composition and/or pig train 108 is fed from a mains pipe 102 into the service pipe 104 and seals the leak/hole/crack 106. The sealant composition and/or pig train 108 exits the mains pipe in a flow stream 110 (having been introduced into the mains pipe at entry 101. For all examples in this invention, network valves are closed upstream (valve 130) and downstream (valve 120) is open and, if required, a service pipe valve 140 is also closed. The closure of network valves is typically several hundred meters (D) away from the service pipe. The service pipe valve is closed during the leak curing process. It should be understood that this figure is a simplification of the actual pipe network, which comprises numerous service pipes, some of which leak and some of which are intact. This methodology is repeated for each hole/crack etc. in each service pipe until no further leaks are detected.

The pig train and/or sealant composition will typically not enter an intact service pipe due a lack of flow thereof into it.

It should be noted that the methods and systems of the present invention, there is no set limit on the length of the lateral. According to some embodiments, there is an upper diameter limit of 2" for the laterals. In practice, a length of a lateral pipe is typically, but not always, less than 40-50 meters.

Figure 1B:
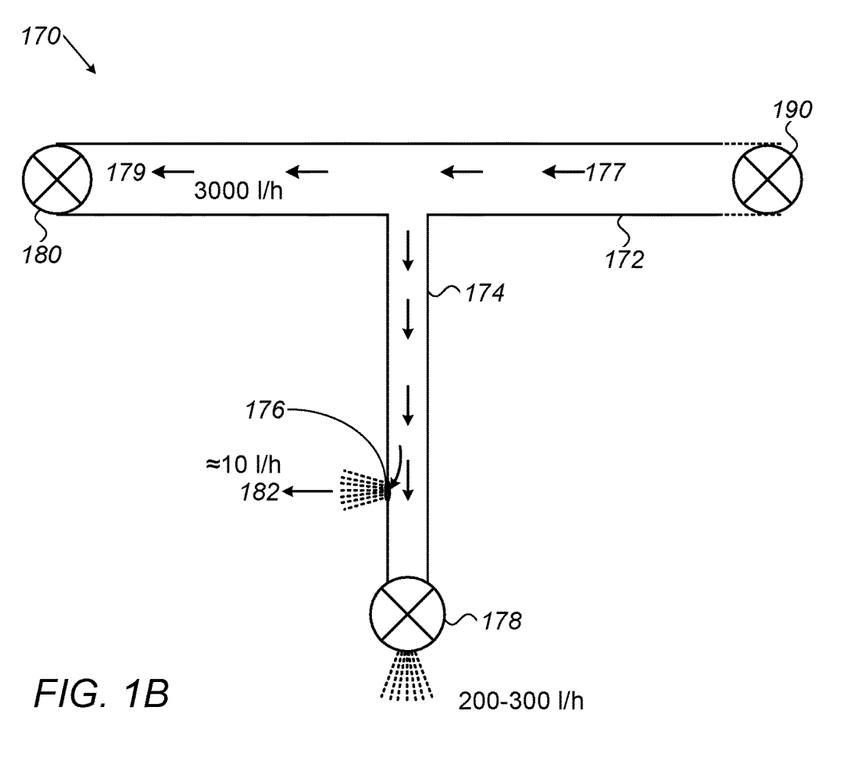
FIG. 1B is a simplified schematic diagram of another system for curing a small leak in a lateral (service) pipe connected to a mains pipe, in accordance with an embodiment of the present invention.

Reference is now made to FIG. 1B, which is a simplified schematic diagram of another system 170 for curing a small leak 182 in a lateral (service) pipe 174 connected to a mains pipe 172, in accordance with an embodiment of the present invention.

A sealant composition and/or pig train 177 is fed from a mains pipe 172 into the service pipe 174 and seals the leak/hole/crack 176. The sealant composition and/or pig train (not shown) exits the mains pipe in a flow stream 179 (having been introduced into the mains pipe at entry 177. For all examples in this invention, network valves are typically closed upstream (valve 190) and downstream (valve 180) is open. In this case a service pipe valve 178 is open to induce a flow of 100-500 l/hr out of valve 178 into the lateral pipe to seal the leakage 176, in passing through.

The closure of network valves is typically several hundred meters (D) away from the service pipe. The service pipe valve is closed during the leak curing process. It should be understood that this figure is a simplification of the actual pipe network, which comprises numerous service pipes, some of which leak and some of which are intact. This methodology is repeated for each hole/crack etc. in each service pipe until no further leaks are detected.

The pig train and/or sealant composition will typically not enter by any significant measure into a service pipe if the flow into said service pipe is too low.

Figure 2:
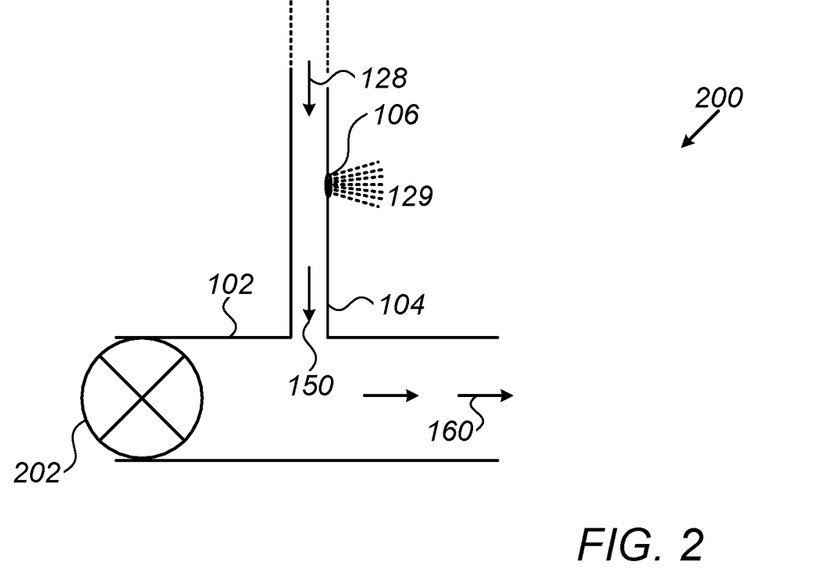
FIG. 2 is another simplified schematic diagram of a system for curing a leak in a lateral (service) pipe, in accordance with an embodiment of the present invention.

Turning to FIG. 2, there is seen another simplified schematic diagram of a system 200 for curing a leak 106 in a lateral (service) pipe 104, in accordance with an embodiment of the present invention. In this case, a sealant composition and/or pig train 128 is fed in from the service pipe and exits through the hole/crack 106 via small stream 129 from the service pipe and in main stream 160 from a mains pipe 102. For sake of simplicity, not all pumps, valves etc. are not all shown in the ensuing diagrams. The upstream service pipe 102 is closed by means of a valve 202.

Figure 3A:
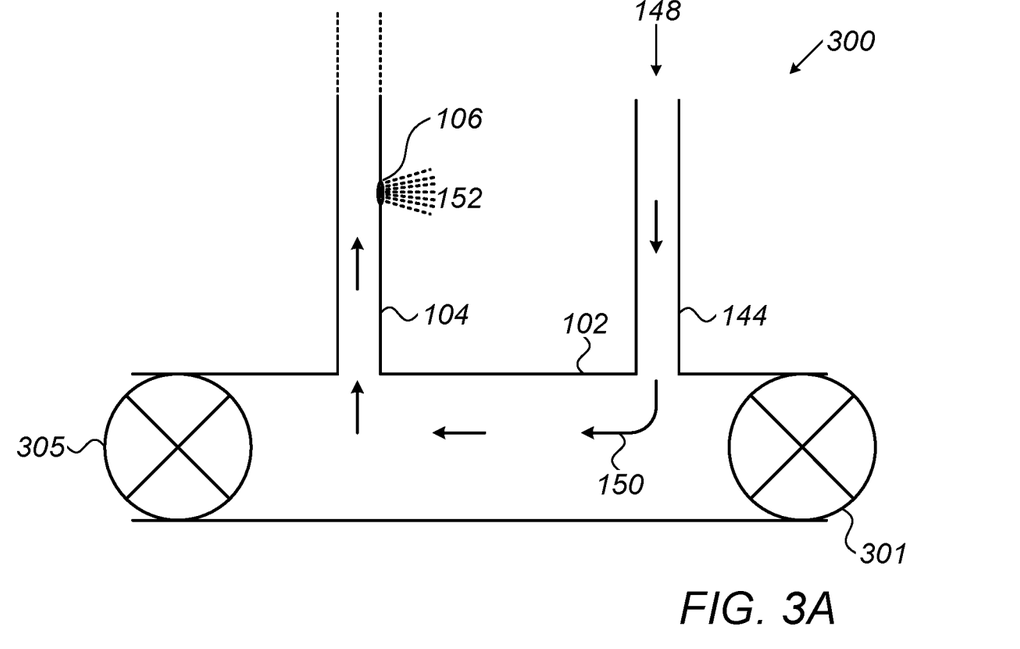
FIG. 3A is a simplified schematic diagram of a system for curing a leak in a second lateral (service) pipe, in accordance with an embodiment of the present invention.

Additionally, FIG. 3A shows a simplified schematic diagram of a system 300 for curing a leak 106 in a second lateral (service) pipe 104, in accordance with an embodiment of the present invention. In this case, the sealant composition and/or pig train 148 is fed in through a first service pipe 144, travels through a mains pipe 102 in stream 150 to the second service pipe and exits the second service pipe in stream 152 through the hole/crack etc. Valves 301 and 303 in the mains pipe are closed.

Figure 3B:
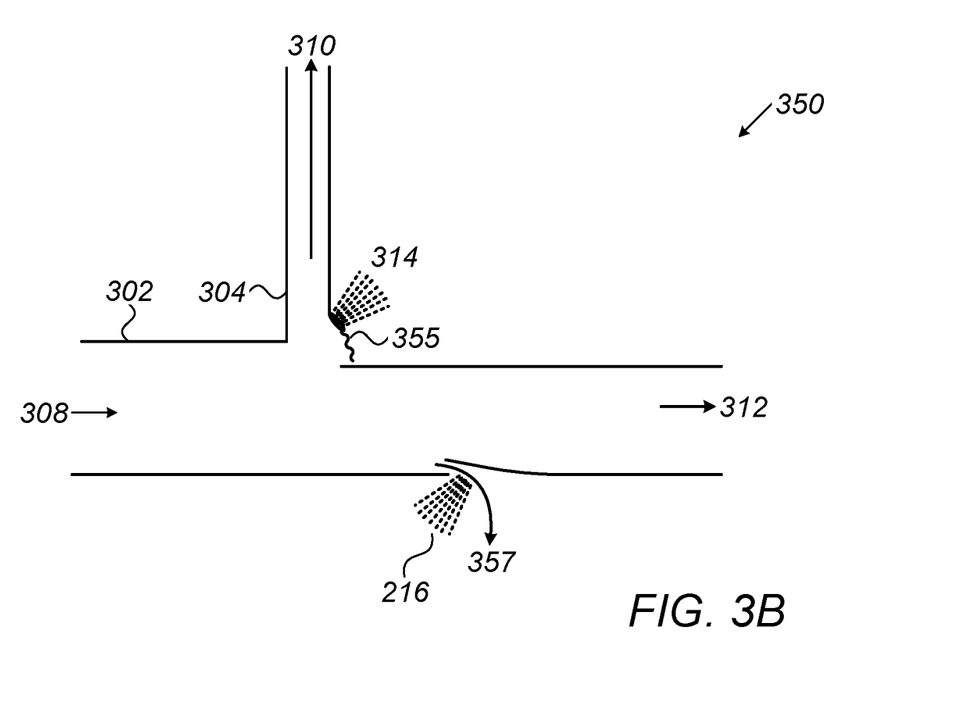
FIG. 3B is a simplified schematic diagram of different types of leaks in a mains or lateral (service) pipe, in accordance with an embodiment of the present invention.

Reference is now made to FIG. 3B, which is a simplified schematic diagram of different types of leaks 355, 357 in a mains 302 or lateral (service) pipe 304, in accordance with an embodiment of the present invention. Leak 355 is a leak along a connection/weld area between the service pipe and the mains, leading to a fracture/longitudinal leak area 314. Leak 357 is due to a misalignment of two parts of the mains pipe, leading to a spray of the liquid 316 out of the leak. Many other examples of pipe leaks exist and these examples are not meant to be limiting, but rather exemplary. The liquid or fluid (such as water) 308 flows along a mains pipe 302 and leaks at leaks 355 and 357. Some of the liquid exits a service pipe 304 in stream 310 and some in stream 312 from the mains pipe. The total liquid leaked is the leakage volume of =308−(310+312).

Figure 4:
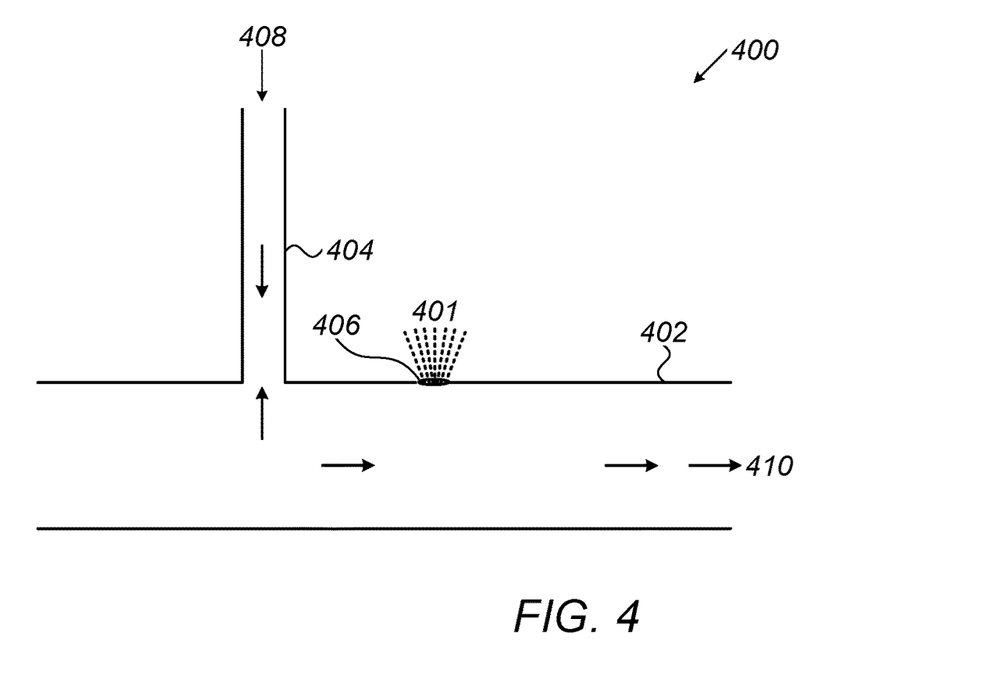
FIG. 4 is a simplified schematic diagram of a system for curing a leak in a mains pipe, in accordance with an embodiment of the present invention.

Turning to FIG. 4, there is seen a simplified schematic diagram of a system 400 for curing a leak site 406 in a mains pipe 402, in accordance with an embodiment of the present invention. A leak flow 401 exits leak site 406. A sealant composition and/or pig train 408 is fed via a service pipe 404 into the mains pipe. It exits the mains pipe in stream 410.

Figure 5:
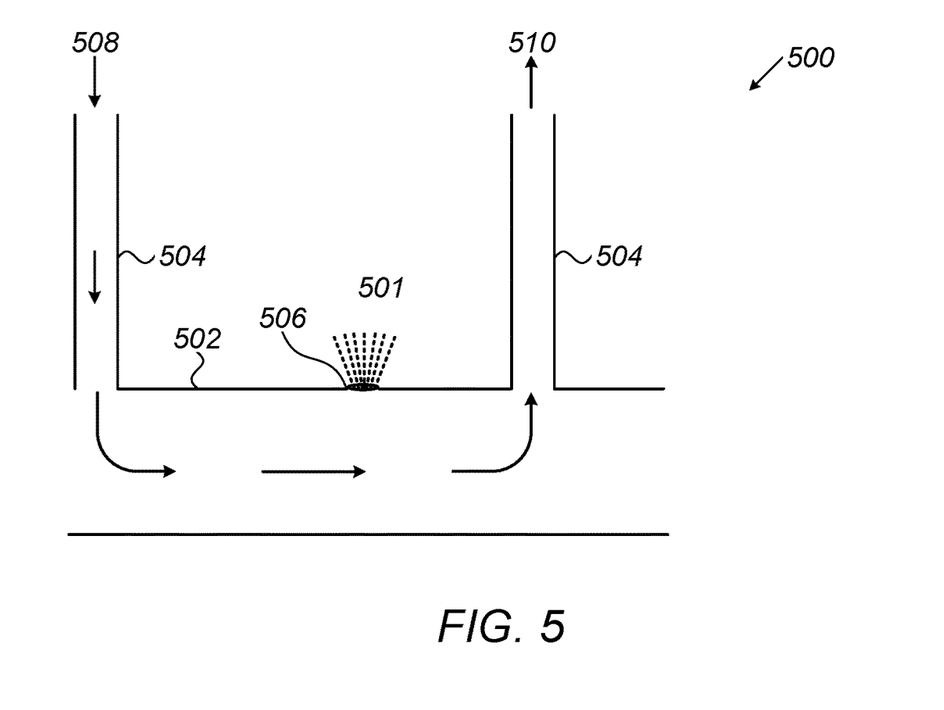
FIG. 5 is another simplified schematic diagram of a system for curing a leak in a mains pipe, in accordance with an embodiment of the present invention.

Additionally, FIG. 5 shows another simplified schematic diagram of a system 500 for curing a leak 501 exiting from a leak site 506 in a mains pipe 502, in accordance with an embodiment of the present invention. A sealant composition and/or pig train 508 is fed via a first service pipe 504 into the mains pipe. It exits the mains pipe via second service pipe 514 in stream 510.

Figure 6:
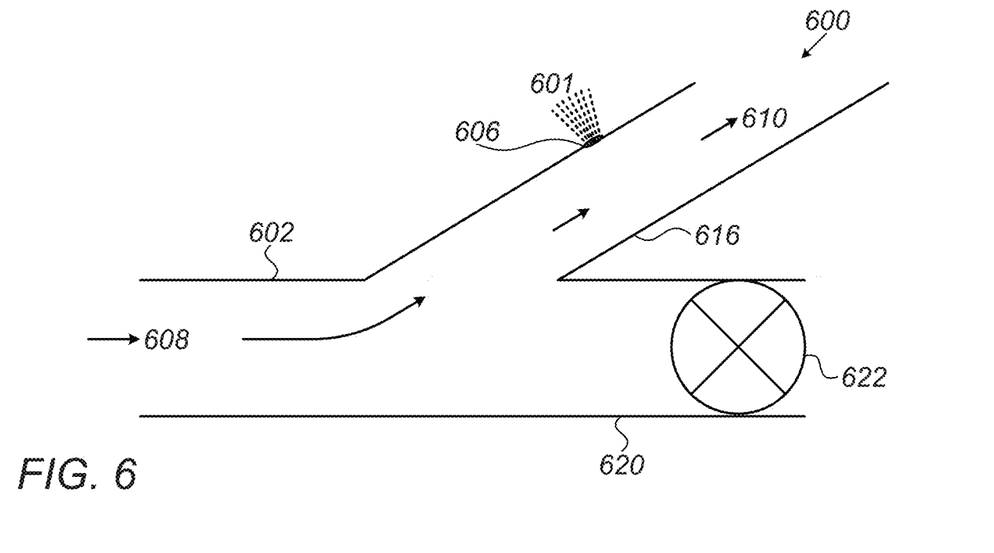
FIG. 6 is a simplified schematic diagram of a system for curing a leak in a branch pipe, in accordance with an embodiment of the present invention.

Reference is now made to FIG. 6, which is a simplified schematic diagram of a system 600 for curing a leak 601 from a leak site 606 in a branch pipe 616, in accordance with an embodiment of the present invention. A flow of a liquid 608 passes in a mains pipe 602. In order to cure leak 606, flow in the mains pipe 620 is stopped by valve 622, downstream of the branch pipe. This increases the pressure of flow 610 and allows a sealant composition and/or pig train to travel from 608 into the branch pipe and to seal and cure leak site 606.

Figure 7:
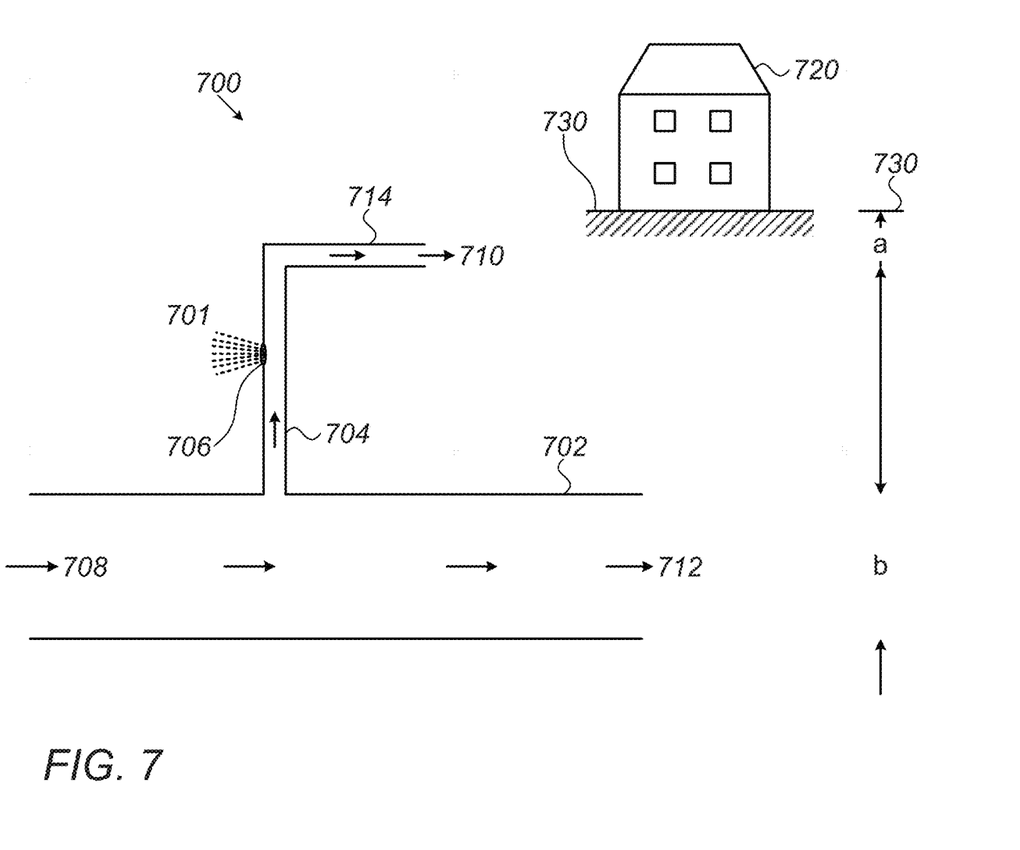
FIG. 7 is a simplified schematic diagram of a system for curing a leak in a riser pipe, in accordance with an embodiment of the present invention.

Turning to FIG. 7, there is seen a simplified schematic diagram of a system 700 for curing a leak flow 701 from a leak site 706 in a riser pipe 704, in accordance with an embodiment of the present invention. Typically a mains pipe 702 is at a depth of a+b from a ground level 730. A riser pipe 704 conveys fluids from the mains to one or more service/lateral pipes 714 to one or more commercial or residential buildings 720, at a depth a. In order to cure leak 706, a sealant composition and/or pig train travels via flow 708 up the riser pipe and out of the lateral pipe at flow 710 and seals and cures the leak in the riser pipe en passant. Additionally or alternatively, this may be performed in the opposite direction.

Figure 8:
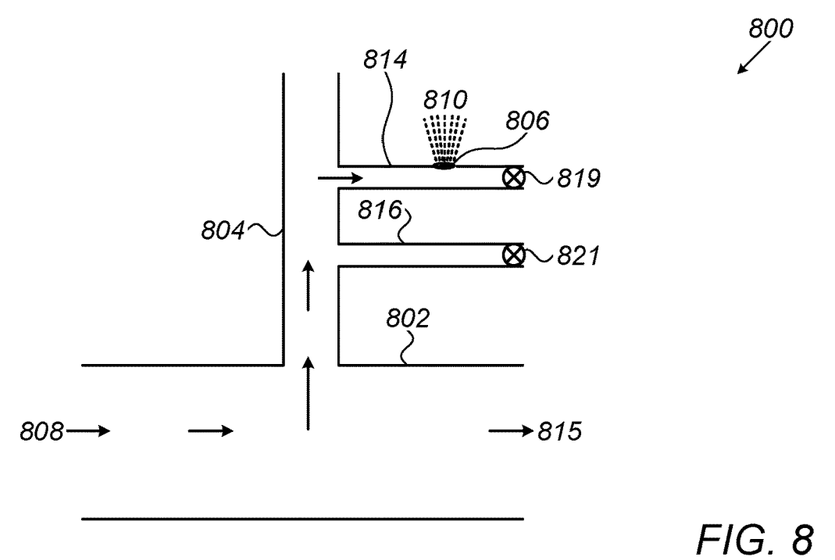
FIG. 8 is a simplified schematic diagram of a system for curing a leak in a secondary service (lateral) pipe, in accordance with an embodiment of the present invention.

Additionally, FIG. 8 shows a simplified schematic diagram of a system 800 for curing a leak 806 in a secondary service (lateral) pipe 814, in accordance with an embodiment of the present invention. A pig train is introduced to a mains pipe 802 in a flow 808. Some of the liquid flows into a primary service pipe or riser 804 and then into secondary lateral pipe 814 (but not into secondary lateral pipe 816, into which there is no leak). If there is sufficient liquid, it flows through the leak area, the flow of sealant composition will seal and cure leak 806 en passant. Valves 819 and 821 are closed. The sealant composition exits the system at flow 810 out of hole/crack 806 and 814. In some cases, flow 815 will be stopped with a suitable valve or other mechanical device.

Figure 9:
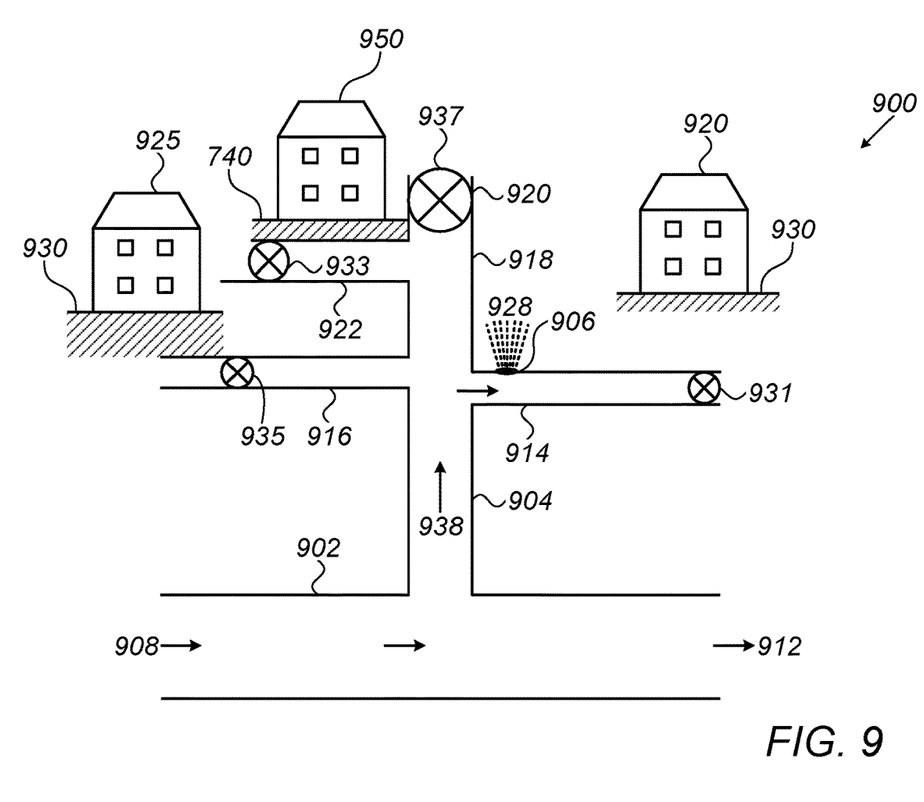
FIG. 9 is another simplified schematic diagram of a system for curing a leak in a secondary service (lateral) pipe, in accordance with an embodiment of the present invention.

Reference is now made to FIG. 9, which is another simplified schematic diagram of a system 900 for curing a leak 906 in a secondary service (lateral) pipe 914, in accordance with an embodiment of the present invention. A plurality of secondary lateral pipes 914, 916 and 922 provide residential buildings 920, 925 and 950 with water from a mains pipe 902, via a riser or primary service pipe 904.

A sealant composition and/or pig train is introduced to a mains pipe 902 in a flow 908. Some of the liquid flows into the primary service pipe or riser 904, and then into lateral 914. Valves 931, 933, 935 and 937 are closed. If there is sufficient liquid flow through the leak area, the flow of sealant composition will seal and cure leak 906 with flow 928 through the leak/crack/hole. The sealant composition and/or pig train exits the system at flow 912.

Figure 10:
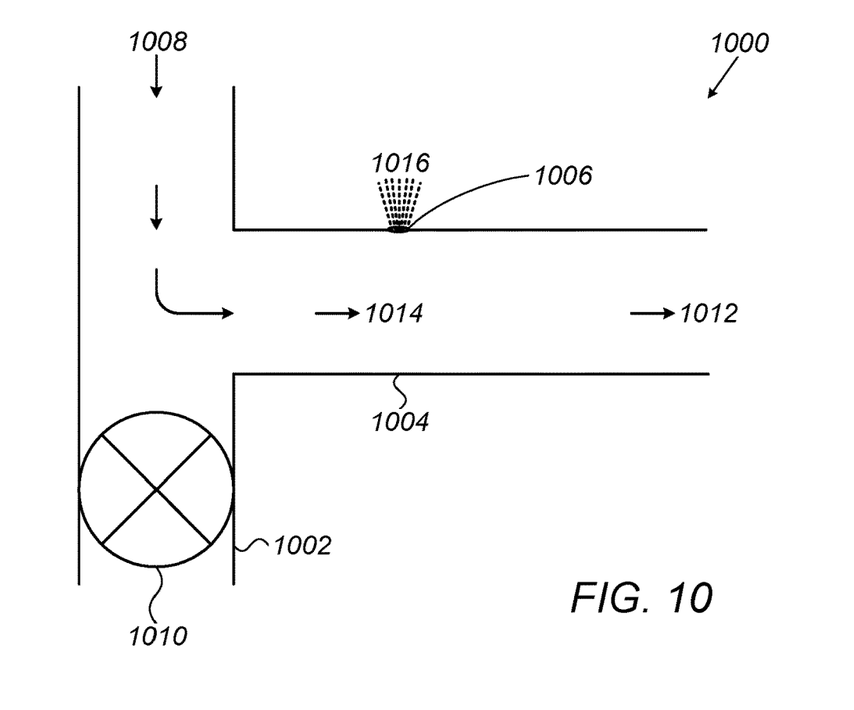
FIG. 10 is a simplified schematic diagram of a system for curing a large leak in a branch pipe, in accordance with an embodiment of the present invention.

Turning to FIG. 10, there is seen a simplified schematic diagram of a system 1000 for curing a large leak 1006 in a branch pipe 1004, in accordance with an embodiment of the present invention. A sealant composition and/or pig train is introduced to a mains pipe 1002 in a flow 1008. Valve 1010 stoppers the mains pipe 1002 or by any other suitable flow stopping device. The sealant composition and/or pig train passes through the branch pipe in flow 1014 past the leak 1006. A large volume of sealant 1016 passes through the leak until it is sealed and cured. The sealant composition and/or pig train exits the system at flow 1012.

Figure 11:
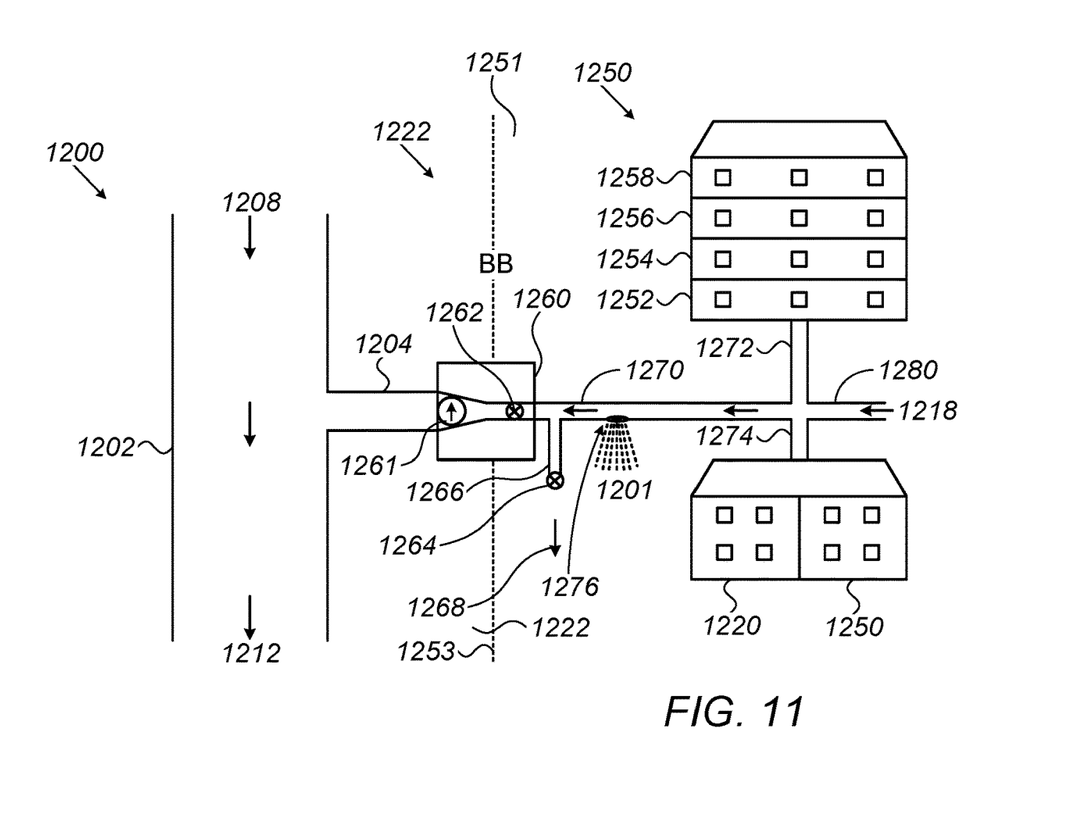
FIG. 11 is a simplified schematic diagram of a system for curing a leak in a residential supply pipe, in accordance with an embodiment of the present invention.

Reference is now made to FIG. 11, which is a simplified schematic diagram of a system 1200 for curing a leak 1201 from a leak site 1276 in a residential buried pipe 1270, in accordance with an embodiment of the present invention. A sealant composition and/or pig train is introduced to a lateral pipe 1280. The lateral pipe has one or more fluidly-connected secondary laterals 1272, 1274, each servicing one or more residential buildings 1250, and 1220, 1230, respectively. Residential building 1250 comprises a number of apartments 1252, 1254, 1256 and 1258. Residential building 1220 and 1230 are houses, for example. A continuation of pipe 1280 is pipe 1270, which leads to a boundary box 1260, disposed on a boundary line 1253, separating private residential ground 1251 from municipal property 1222. Another lateral 1204 connects the boundary box to a mains pipe 1202.

The sealant composition and/or pig train flows along lateral 1280 to pipe 1270. The boundary box may comprise at least one meter 1261 and at least one valve 1262. Leak site 1276 having leak 1201 is cured by the sealant composition and/or pig train. The pig train and/or fluid flow 1268 may be recovered at a tap 1264 (optionally introduced for the purpose of sealing the pipeline), disposed before/in front of the boundary box, which is in fluid connection via a pipe 1266. When performing the sealing and/or curing process as described above, all water valves and/or taps in the residences need to be turned off and, boundary box valve 1262 needs to be closed.

In some alternate embodiments, the flow direction of the pig train/sealant composition is from pipe 1266 into lateral pipe 1270 to cure leak 1201 and the fluid flow exits via pipe 1280.

By lateral pipe is meant any service pipe, communication pipe, small pipe, non-mains pipe being connected to a mains pipe in various types of connections and orientations, often, but not necessarily, at an angle of 90°.

Application 1

Repair method "inside" lateral (diversion) line pipe.

The present invention relates to a process for repairing pipes, tubing from the "inside", in particular, to methods of repair lateral line pipes.

In accordance with this method, repair materials are fed into a mains pipe, from which the lateral pipe is in fluid connection. The repair materials are fed under pressure into and at a constant speed along the mains pipeline. Upon passing the junction/connection between the main pipeline and the service pipe, some of the repair material passes up the service pipe to the area of the leak and then through the hole/crack, where it hardens after sealing it, leading to the curing of the service pipe. This eliminates or significantly reduces leakage from the service pipe. Some aspects of the present invention provide novel methods and systems for increased reliability in the sealing of leakages in lateral pipes.

At the same time it is assumed to simplify the process of repair of such pipes and avoiding the need to excavate. This goal is achieved by the fact that the repair material is fed into the lateral pipe to be repaired through the main pipe. Thus, the repair material passes as for repair of the main pipe in one direction (one end of the pipeline to the other). After the repair the remaining material is returned to the place of loading and flushed out of the pipe to be repaired.

Another non-limiting example of sealant composition 108 is:
 a) plant fibers of different sizes;
 b) Silica;
 c) at least one sealant composition; and
 d) water.

Another non-limiting example of composition 108 is:
 a) hemp plant fibers of different sizes;
 b) Silica;
 c) at least one sealant composition; and
 d) water.

Typically, fibers are used in compositions for building purposes. Some fibers are in the form of a yarn, that is, a continuous often-plied strand composed of either natural or man-made fibers or filaments.

In one non-limiting example, hemp yarn has a size of Nm 10 (Nm 10 yarn=10,000 meters per kilogram, or about 4,960 yards per pound) from single to multiple plies of 2, 3, 5, 6 and 12 in either natural or bleached (using peroxide) Made from earth-friendly wet spun hemp, these yarns are smooth and durable The yarns may be provided on spools or in packages and may be single-ply, 2-ply, 3-ply, 6-ply and 12-ply or combinations thereof.

The pigs, sealant compositions, carrier fluid compositions and chips used in the present invention may be any described in the following patents/patent applications, incorporated herein by reference:—WO2008/081441, to Perstnev et al., WO2016042541A1, WO2016098093A1, WO2016098094A1, WO2016098095A1, U.S. Pat. Nos. 9,045,648, 9,738,798B2, US20170299108A1, US20170363245A1 and US20180003330A1.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

REFERENCES

Bogoeva-Gaceva, G., Avella, M., Malinconico, M., Buzarovska, A., Grozdanov, A., Gentile, G., & Errico, M. E. (2007). Natural fiber eco-composites. Polymer composites, 28(1), 98-107.

Célino, A., Fréour, S., Jacquemin, F., & Casari, P. (2014). The hygroscopic behavior of plant fibers: A review. Frontiers in chemistry, 1, 43.

Mwaikambo, L. Y., & Ansell, M. P. (2002). Chemical modification of hemp, sisal, jute, and kapok fibers by alkalization. *Journal of applied polymer science,* 84(12), 2222-2234.

Wang, B., Sain, M., & Oksman, K. (2007). Study of structural morphology of hemp fiber from the micro to the nanoscale. *Applied Composite Materials,* 14(2), 89.

The invention claimed is:

1. A method for sealing at least one leak in at least one lateral pipe, the method comprising:
 a) closing at least one residential valve;
 b) passing at least one pig train comprising at least one gel pig and at least one sealant composition comprising at least one of wound fibers and yarns, under pressure along a mains pipe from a first end thereof and said at least one lateral pipe, wherein said lateral pipe is at an angle of 30-90 degrees to said mains pipe, such that a portion of said pig train enters said at least one leakage site in said at least one lateral pipe to seal said at least one leak in said at least one lateral pipe, wherein said leak is selected from the group consisting of a hole, a crack, a corroded section and combinations thereof, and wherein said mains pipe is of a diameter of 4-50 inches, 6-40 inches, 8-30 inches, 10-20 inches and said lateral pipe is of a diameter of 0.5-4 inches, 1-3 inches, or 2-2.5 inches, and wherein another portion of the pig train continues along the mains pipe and exits the mains pipe at a second end thereof.

2. A method according to claim 1, wherein said leak is in a first lateral pipe.

3. A method according to claim 1, further comprising passing said at least one of a pig train and said sealant composition from a second lateral pipe into said mains pipe.

4. A method according to claim 1, for sealing a leak in a second lateral pipeline, the method comprising:
 closing a plurality of residential valves;
 passing at least one of a pig train and a sealant composition under pressure along a first lateral pipeline to a main pipeline such that a portion of said at least one of a pig train and a sealant composition enters said second lateral pipe line to a location of said leak to seal said leak.

5. A method according to claim 1, wherein said leak is selected from the group consisting of a hole, a crack, a corroded section and combinations thereof.

6. A method according to claim 1, further comprising sealing at least one leak in said main pipeline.

7. A method according to claim 1, further comprising sealing a plurality of leaks in a plurality of lateral pipes.

8. A method according to claim 1, wherein said seal is formed in less than forty minutes for every 100 meters of pipe after entering said pipe.

9. A method according to claim 1, wherein the at least one lateral pipe is of a length of less than 1000 m, less than 100 m or less than 50 m.

10. A method according to claim 1, wherein the at least one lateral pipe is made of any material or material combination, selected from the group consisting of cast iron, ductile iron, steel, HDPE, MDPE, PVC and combinations thereof.

11. A method for sealing a leak at a leakage site in a mains pipe, the method comprising:
 a) closing a plurality of residential valves;
 b) passing at least one of a pig train and a sealant composition under pressure along a lateral pipeline such that a portion of said at least one of a pig train and said sealant composition enters said mains pipe from said lateral pipeline; and
 c) allowing said portion to reach said leak site and to seal said leak, wherein said lateral pipe is at an angle of 30-90 degrees to said mains pipe, wherein the lateral pipe has an internal diameter of 2 inches or less, less than 1.5 inches, less than 1 inch, less than ¾ inch, less than ⅕ inch or less than ⅜ inch, and wherein said mains pipe is of a diameter of 4-50 inches, 6-40 inches, 8-30 inches, or 10-20 inches.

12. A method according to claim 11, wherein the main pipeline and lateral pipe are adapted to convey a fluid selected from the group consisting of water, oil, gas, petrol, a heating fluid and a cooling fluid.

13. A method according to claim 11, wherein said pig train and said sealant composition comprise at least one gel pig.

14. A method according to claim 13, wherein said pig train further comprises a sealant composition.

15. A method according to claim 14, wherein said sealant composition comprises at least one of fibers and chips.

16. A method according to claim 15, wherein said sealant composition comprises:
 a. a hardener;
 b. a resin;
 c. an elastic material; and
 d. a polycondensate material.

17. A method according to claim 15, wherein said at least one gel pig comprises:
 a. a cellulosic polysaccharide; and
 b. water.

18. A method according to claim 17, wherein said at least one gel pig further comprises boric acid.

19. A system for sealing a leak in a lateral pipe from a main pipeline, the system comprising:
 a) at least one sealant composition comprising at least one of wound fibers and yarns;
 b) at least one gel pig;
 c) a plurality of residential valves; and
 d) a pressure control system for controlling at least one of a pressure in said main pipeline and a pressure in said lateral pipe by controlling the plurality of residential valves, whereby said at least one gel pig is adapted to push a portion of said at least one sealant composition from said mains pipe into said lateral pipe and to push another portion of said at least one sealant composition along said mains pipeline, wherein said mains pipe is of a diameter of 4-50 inches, or 6-40 inches, or 8-30 inches, or 10-20 inches and said residential pipe is of a diameter of 0.5-4 inches, or 1-3 inches, or 2-2.5 inches, and wherein said leak is selected from the group consisting of a hole, a crack, a corroded section and combinations thereof.

20. A system according to claim 19, wherein said sealant composition further comprises
 a. fibers;
 b. particles such as silica;
 c. at least one sealant; and
 d. water.

21. A system according to claim 20, where said fibers are in at least one form selected from the group consisting of: single fibers, wound fibers, yarns and combinations thereof.

22. A system according to claim 21, wherein said yarn is single-ply, 2-ply, 3-ply, 6-ply and 12-ply and combinations thereof.

* * * * *